(12) United States Patent
Detwiler et al.

(10) Patent No.: US 7,552,874 B2
(45) Date of Patent: Jun. 30, 2009

(54) OPTICAL SCANNER

(75) Inventors: Paul O. Detwiler, Lawrenceville, GA (US); Rex A. Aleshire, Buford, GA (US)

(73) Assignee: NCR Corporation, Dayton, OH (US)

( * ) Notice: Subject to any disclaimer, the term of this patent is extended or adjusted under 35 U.S.C. 154(b) by 578 days.

(21) Appl. No.: 11/263,364

(22) Filed: Oct. 31, 2005

(65) Prior Publication Data

US 2007/0095919 A1    May 3, 2007

(51) Int. Cl.
*G06K 7/10* (2006.01)
(52) U.S. Cl. .............. 235/462.4; 235/462.01; 235/462.43; 235/472.01
(58) Field of Classification Search .................. 235/462.01–462.43, 472.01–472.03
See application file for complete search history.

(56) References Cited

U.S. PATENT DOCUMENTS

| | | | |
|---|---|---|---|
| 5,684,289 A | 11/1997 | Detwiler et al. | |
| 5,710,417 A | 1/1998 | Joseph et al. | |
| 5,796,091 A | 8/1998 | Schmidt et al. | |
| 6,581,832 B1 | 6/2003 | Kato et al. | |
| 2001/0017320 A1* | 8/2001 | Knowles et al. | 235/462.37 |
| 2004/0056099 A1* | 3/2004 | Barkan | 235/462.39 |
| 2006/0113394 A1* | 6/2006 | Hammer | 235/462.39 |

FOREIGN PATENT DOCUMENTS

DE    42 13 340 A1    11/1992

* cited by examiner

*Primary Examiner*—Allyson N Trail
(74) *Attorney, Agent, or Firm*—Paul W. Martin; Harden E. Stevens, III (57) ABSTRACT

An optical scanner includes a scanner housing including a scan window, a laser light source, reflected light detector and a mirrored polygon spinner. The spinner is arranged both to spin around an axis of rotation and to move so as to displace said axis of rotation.

13 Claims, 6 Drawing Sheets

OPTICAL SCANNER

The present invention relates to an optical scanner and more specifically to an optical scanner having enhanced scan volume.

BACKGROUND OF THE INVENTION

Current bi-optic bar code scanner designs produce patterns arranged to read labels passed by the scanner. The patterns are such that action of an operator swiping a bar code across the scanner window will move a typical label of nominal truncation across several scan lines allowing the label to be read. However, with truncated or otherwise difficult bar code labels operators often present the label to the scanner window instead of swiping them. As there are a limited number of spatially separate scan lines it is possible for the label to miss them all and not be read. For example, if a label is presented adjacent a fan of scan lines, but not over the fan of scan lines, then the bar code will not be read.

Commonly assigned U.S. Pat. Nos. 5,229,588, 5,684,289, and 5,886,336 disclose a typical dual aperture optical scanner. The scanning light beams from a laser diode pass through substantially horizontal and vertical apertures to provide more item coverage than a single aperture scanner.

In an effort to increase item coverage, optics designers are increasing the number of scan lines, line length, and scan angles by increasing the number of lasers and pattern mirrors in the scanner. The addition of these components consequently increases cost.

Alternative approaches have been considered in which the scan lines are moved orthogonally to the direction of the lines. This has been achieved by the movement of the laser light source, within the scanner, or the movement of the output mirror. Both of these are mechanically complex solutions which are not suitable for multi-laser or large bi-optic scanners.

Figure 4:
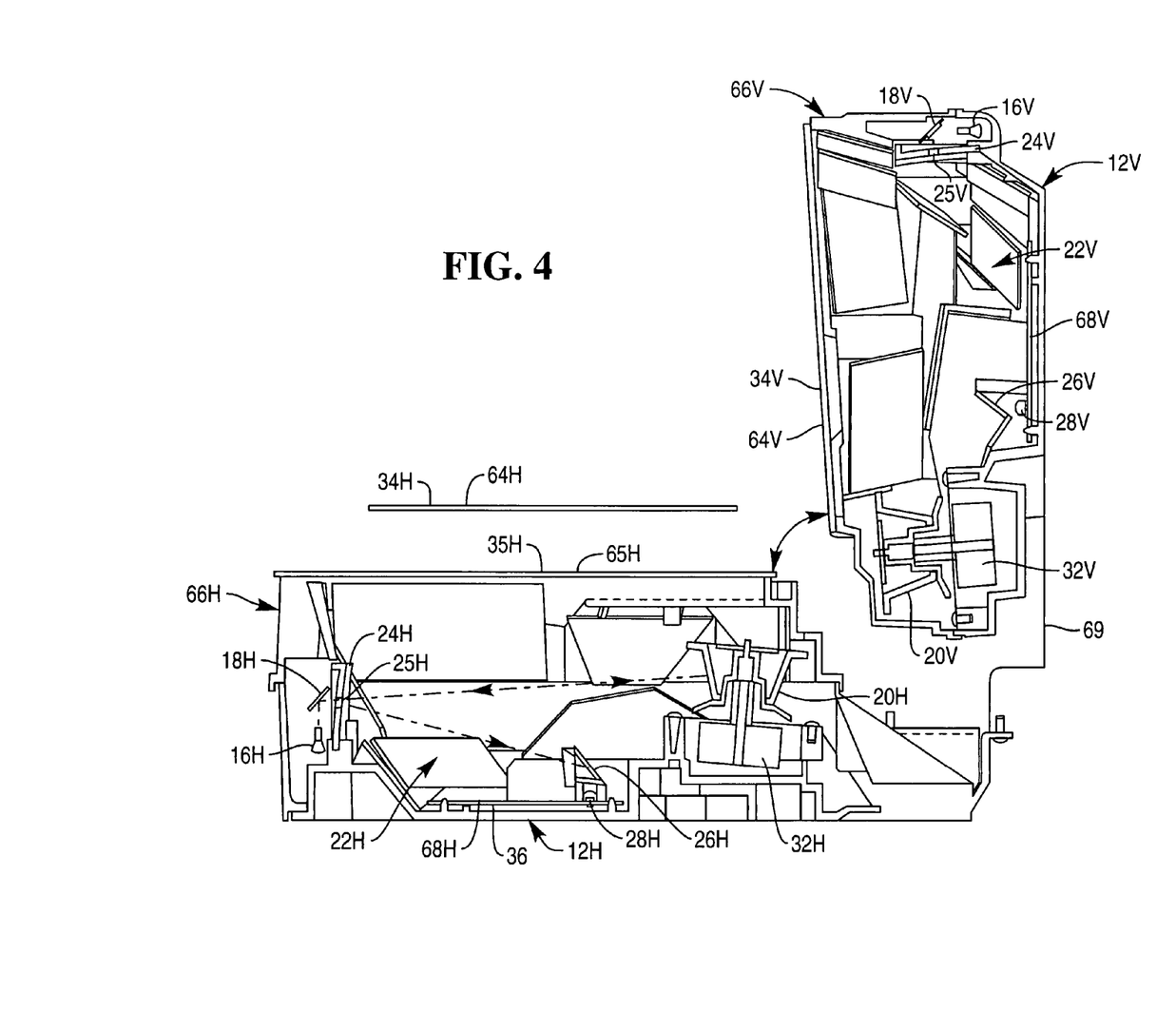
FIG. 4 is a sectional view of the scanner of FIG. 1, along lines 4-4 of FIG. 3.
Figure 5:
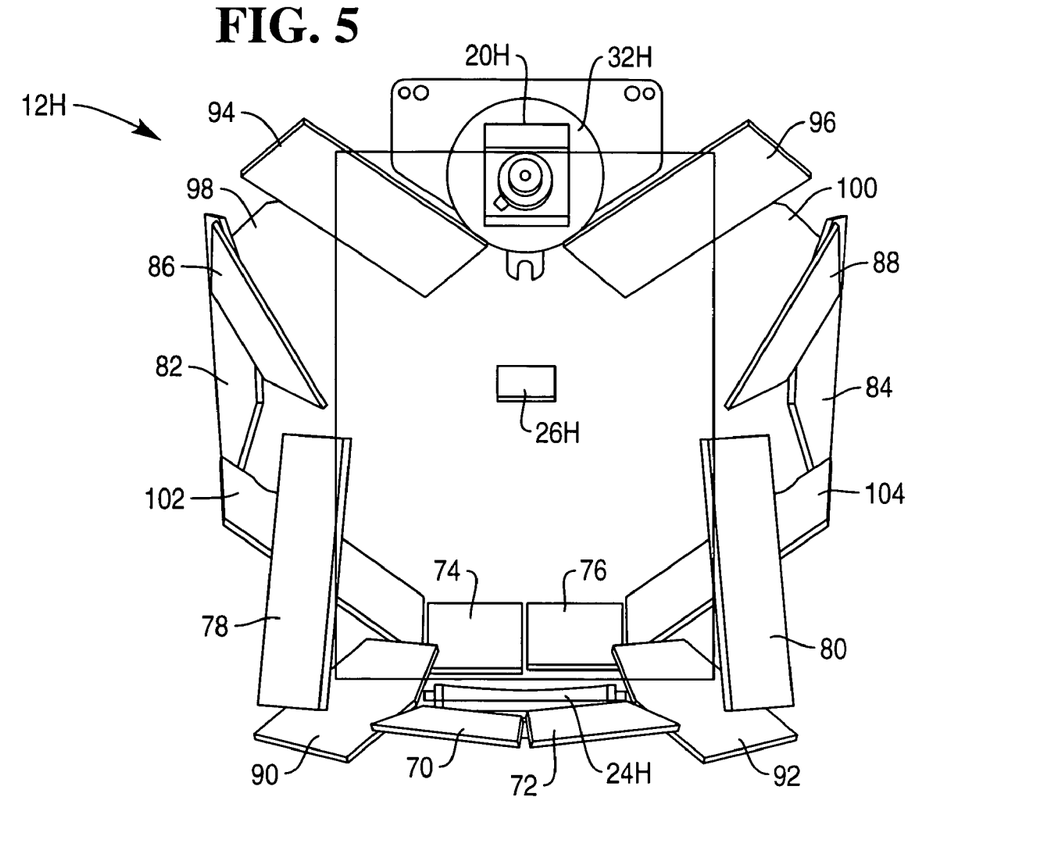
FIG. 5 is a top view of a horizontal mirror basket within a horizontal optics assembly.
Figures 6, 7:
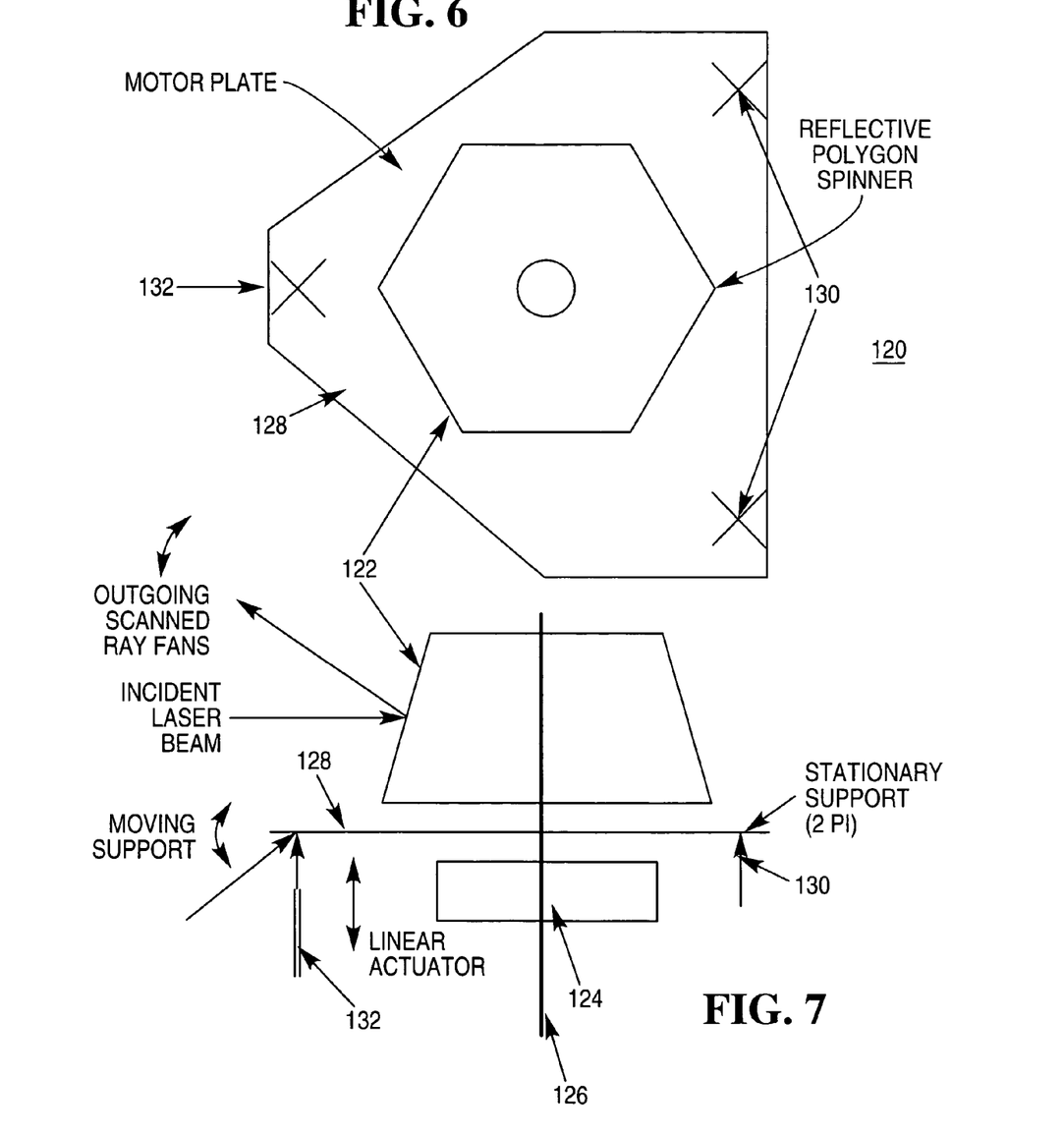
FIG. 6 is plan view of a polygon spinner assembly in accordance with the present invention.
FIG. 7 is a side view of the polygon spinner assembly of FIG. 6.

As will be illustrated in more detail below, with reference to FIGS. 1 to 6, present day scanners comprise, a laser assembly, spinner assembly, collection optics, pattern mirrors, detector assembly, electronics, a window and scanner housing which contains all the individual assemblies. In operation, the laser beam intercepts the polygon spinner rotating about a single axis and is subsequently scanned in a single plane towards a set of pattern mirrors which reflect the individual scan lines out the window and onto a barcode. The laser energy is then reflected off of the barcode and a portion is gathered by the collection optics and focused onto the detector generating a signal to be decoded by the electronics. The positions at which the scan lines exit the window are static, and are contained in a relatively small portion of the hemispherical volume available outside and adjacent to the window (FIG. 6).

SUMMARY OF THE INVENTION

It would be desirable to provide an optical scanner with a reduction in coverage gaps. It would also be desirable to provide a scan engine which can be utilized in an optically simpler barcode scanner (regardless of the number of scanner apertures) for improved manufacturability and reduced cost.

In accordance with a first aspect of the present invention there is provided an optical scanner comprising a scanner housing including a scan window, a laser light source, a reflected light detector and a mirrored polygon spinner which is arranged both to spin around an axis of rotation and to move so as to displace said axis of rotation.

Preferably, the spinner is moved linearly so as displace said axis of rotation. Most preferably, the spinner is mounted on a pivotable mount.

In one embodiment the pivotable mount is pivotably mounted to a fixed support on one side of the spinner and to a movable support on the other side of the spinner. In this embodiment the movable mount is a linear actuator, actuation of which causes the pivotable mount to pivot on the fixed support.

Preferably, the axis of rotation is directed substantially towards the scan window.

Most preferably the polygon spinner is externally mirrored.

In one embodiment the scanner further comprises pattern mirrors arranged to direct light from the polygon spinner through the scan window so as to produce scan lines.

Preferably the scanner further comprises an arrangement of pattern mirrors, or basket of mirrors, arranged to direct light from the polygon spinner through the scan window so as to produce scan lines.

Preferably, the optical scanner further comprises control circuitry in the scanner housing for obtaining bar code information from electrical signals from the reflected light detector.

According to a second aspect of the present invention there is provided a mirrored polygon spinner assembly, for use with an optical scanner, the assembly comprising a spinner and a means of rotating the spinner, the spinner being arranged both to spin around an axis of rotation and to move so as to displace said axis of rotation.

According to a third aspect of the present invention there is provided a method of scanning a bar code utilizing an optical scanner comprising a scanner housing including a scan window, a laser light source, reflected light detector and a mirrored polygon spinner arranged both to spin around an axis of rotation and to move so as to displace said axis of rotation, the method comprising positioning the bar code within the scan volume and moving the spinner so as to displace the axis of rotation which in turn causes movement of the scan lines orthogonally to the direction of said scan lines.

Preferably, the spinner is pivoted back and forth.

Scan engines in accordance with the present invention can not only be utilized in new optical bar code scanners, they can be retrofitted to existing scanners, as described with reference to FIGS. 1 to 6, in place of prior art scan engines. In addition scan engines in accordance with the present invention can be made small enough and in such a way that they can be a common module scan engine for any, or at least most, bar code scanners.

BRIEF DESCRIPTION OF THE DRAWINGS

An embodiment of a prior art dual aperture scanner will now be described, by way of example, with reference to the accompanying drawings, in which.

However, it should be noted that the arrangement of pattern mirrors described with reference to the aforementioned drawings can be utilized in a scanner in accordance with the present invention as long as the scanner also utilizes a spinner in accordance with one aspect of the present invention. Thereafter embodiments of the present invention will be described, by way of example, with reference to the accompanying drawings, in which.

DETAILED DESCRIPTION

Figure 1:
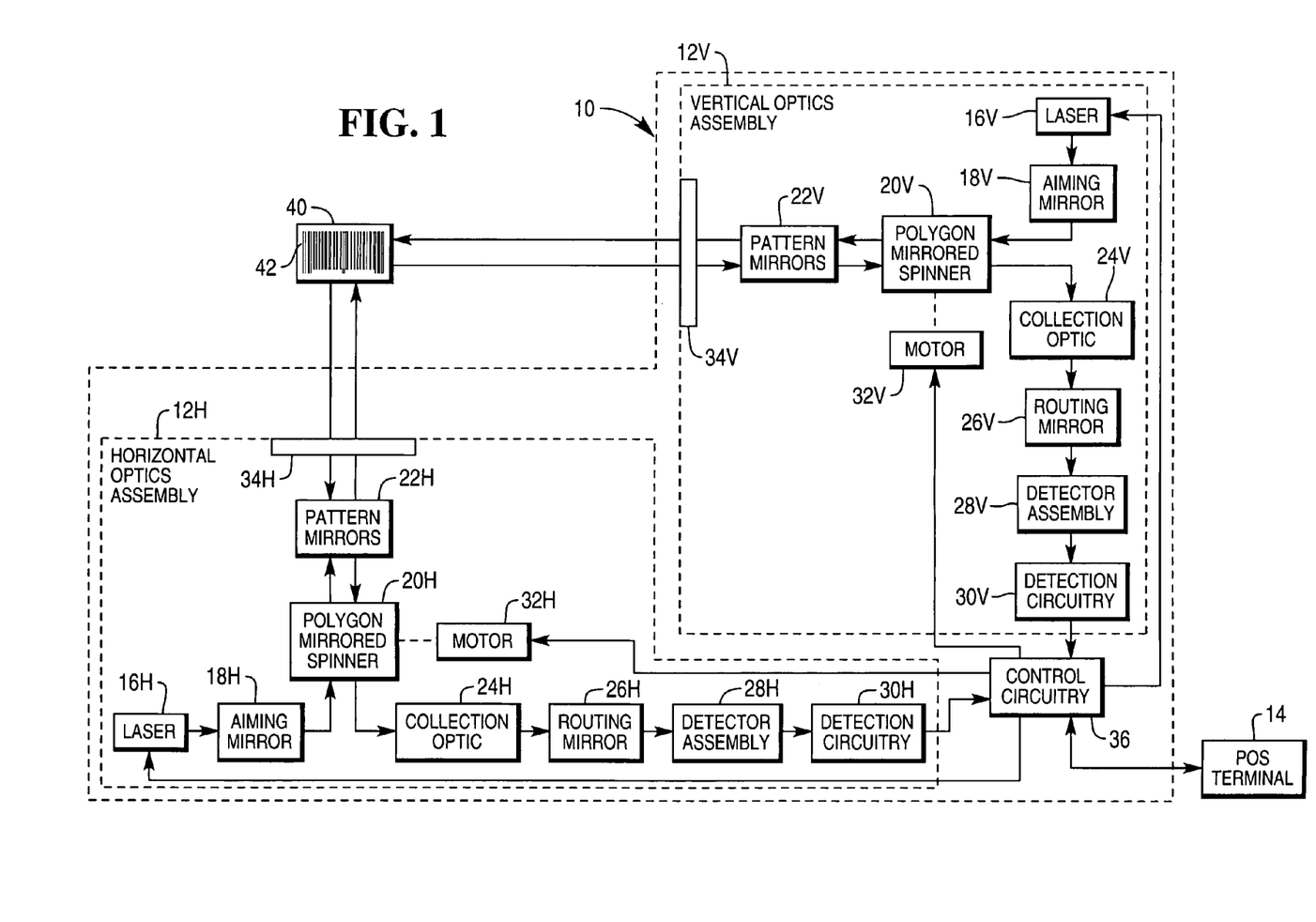
FIG. 1 is a block diagram of a dual aperture optical scanner.

Referring now to FIG. 1, prior art dual aperture optical scanner 10 includes horizontal optics assembly 12H and vertical optics assembly 12V, and control circuitry 36 for controlling horizontal and vertical optics assemblies 12H and 12V. If one of optics assemblies 12H and 12V fails, scanner 10 retains partial operation.

Horizontal optics assembly 12H projects a scan pattern through substantially horizontal aperture 34H to scan bar codes 42 located on bottom, leading, trailing and checker side surfaces of item 40. It will also scan bar codes 42 on intermediate surfaces including those between the bottom and customer side surfaces.

Horizontal optics assembly 12H includes laser 16H, aiming mirror 18H, polygon mirrored spinner 20H, pattern mirrors 22H, routing mirror 26H, collection optic 24H, detector assembly 28H, detection circuitry 30H, and motor 32H.

Laser 16H includes one or more laser diodes or other suitable laser sources. Laser 16H may include a laser having a wavelength of 650 nm.

Aiming mirror 18H aims a laser beam from laser 16H to polygon mirrored spinner 20H. The laser beam passes through a hole 25H in collection optic 24H (FIG. 4).

Polygon mirrored spinner 20H directs the laser beam to pattern mirrors 22H. Polygon mirrored spinner 20H also routes collected light to collection optic 24H. Polygon mirrored spinner 20H preferably includes four facets, but may include other numbers of facets. Facets are grouped into two pairs. Two opposite facets have angles of 74 degrees and 76 degrees from the spinner base. The other pair of opposite facets have angles of 86.5 degrees and 88.5 degrees. Motor 32H rotates polygon mirrored spinner 20H.

Pattern mirrors 22H produce scanning light beams that emanate from substantially horizontal aperture 34H to form a horizontal scan pattern for reading bar code 42 on item 40. Pattern mirrors 22H also collect light reflected from item 40 and direct it to polygon mirrored spinner 20H.

Collection optic 24H routes collected light from polygon mirrored spinner 20H to routing mirror 26H.

Routing mirror 26H routes the collected light to detector assembly 28H.

Detector assembly 28H focuses, optically filters, and converts collected light into electrical signals.

Detection circuitry 30H obtains bar code information from the electrical signals. Detection circuitry 30H includes circuitry for digitizing bar code information.

Vertical optics assembly 12V projects a scan pattern from substantially vertical aperture 34V and primarily scans bar codes located on a customer side and top side of an item. Like horizontal optics assembly 12H, vertical optics assembly 12V scans the leading and trailing sides, as well as intermediate surfaces including those between the bottom and customer side surfaces. However, for simplicity the substantially similar vertical assembly will not be described in detail herein.

Control circuitry 36 processes the electrical signals from detector assemblies 28H and assembly 28V to obtain bar code information. Control circuitry 36 passes the bar code information to POS terminal 14.

Control circuitry 36 controls operation of lasers 16H and 16V and motors 32H and 32V. Control circuitry 36 may remove power from lasers 16H and 16V and motors 32H and 32V to increase their longevity.

POS terminal 14 receives transaction data, for example, in the form of SKU numbers from scanner 10 and completes a transaction by finding price data for the SKU numbers in a price-lookup data file.

Figure 2:
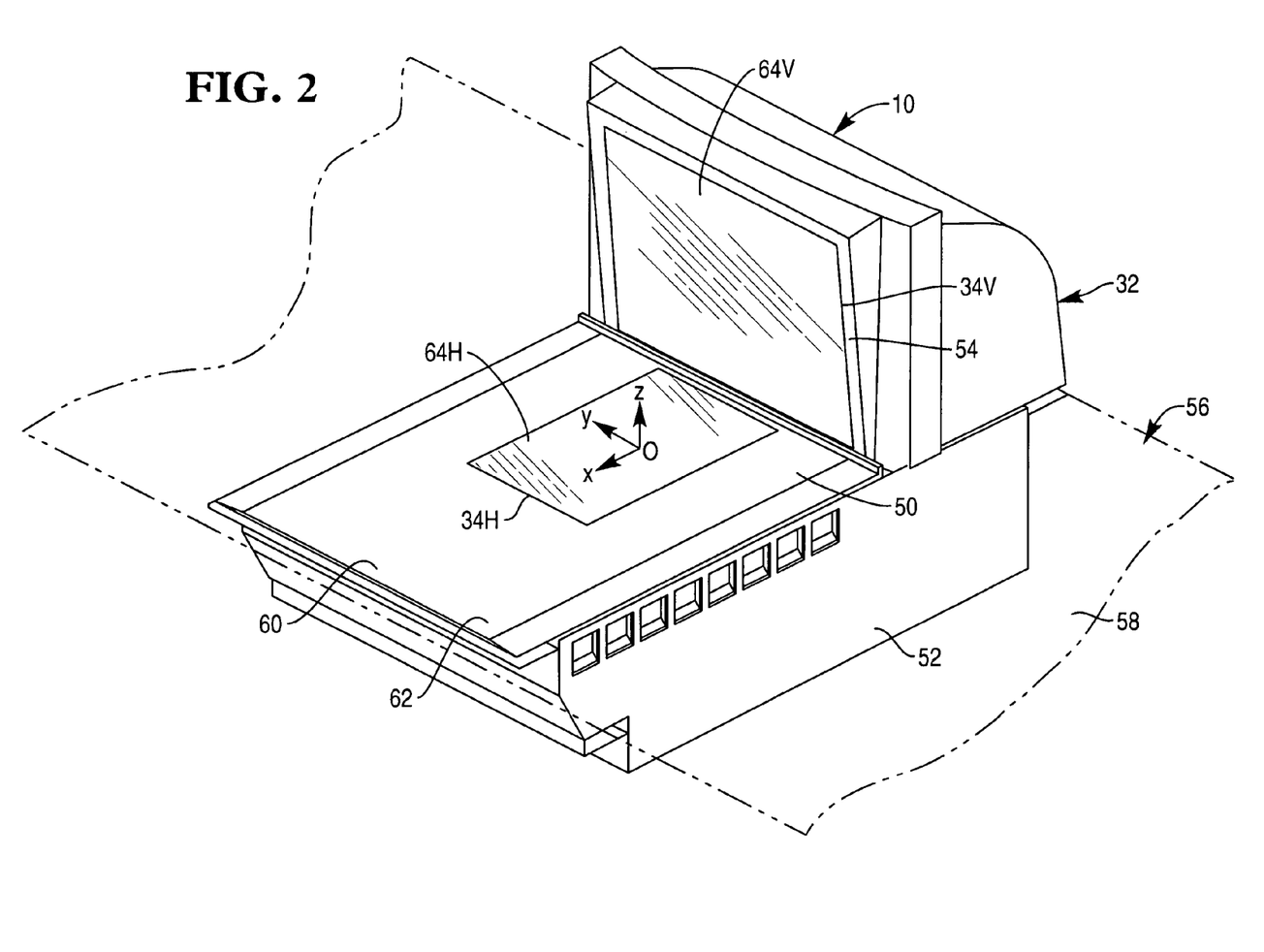
FIG. 2 is an exterior perspective view of the scanner of FIG. 1, including a reference coordinate system for the group of pattern mirrors within the scanner.

Turning now to FIG. 2, scanner 10 is shown in perspective. Scanner 10 as illustrated includes an integral scale 60. Scale 60 includes weigh plate 62, which includes substantially horizontal surface 50 and substantially horizontal aperture 34H. Horizontal window 64H is located within horizontal aperture 34H.

Substantially vertical aperture 34V is located within substantially vertical surface 54. Substantially vertical window 64V is located within substantially vertical aperture 34V.

Scanner 10 includes housing 52. Preferably, housing 52 may be easily adapted to fit in a typical checkout counter 56. It is envisioned that substantially horizontal surface 50 be made substantially flush with top surface 58 of counter 56. Scanner 10 is installed within checkout counter 56 so that substantially vertical aperture 34V faces a store employee or other operator.

An illustrated reference X-Y-Z coordinate system determines orientations of pattern mirrors 22H and 22V within scanner 10 of the present invention. Origin O is defined such that:

X=0 is on the centerline of the scanner;
Z=0 is on the centerline of the scanner; and
Y=0 is on the substantially horizontal surface 50.

Figure 3:
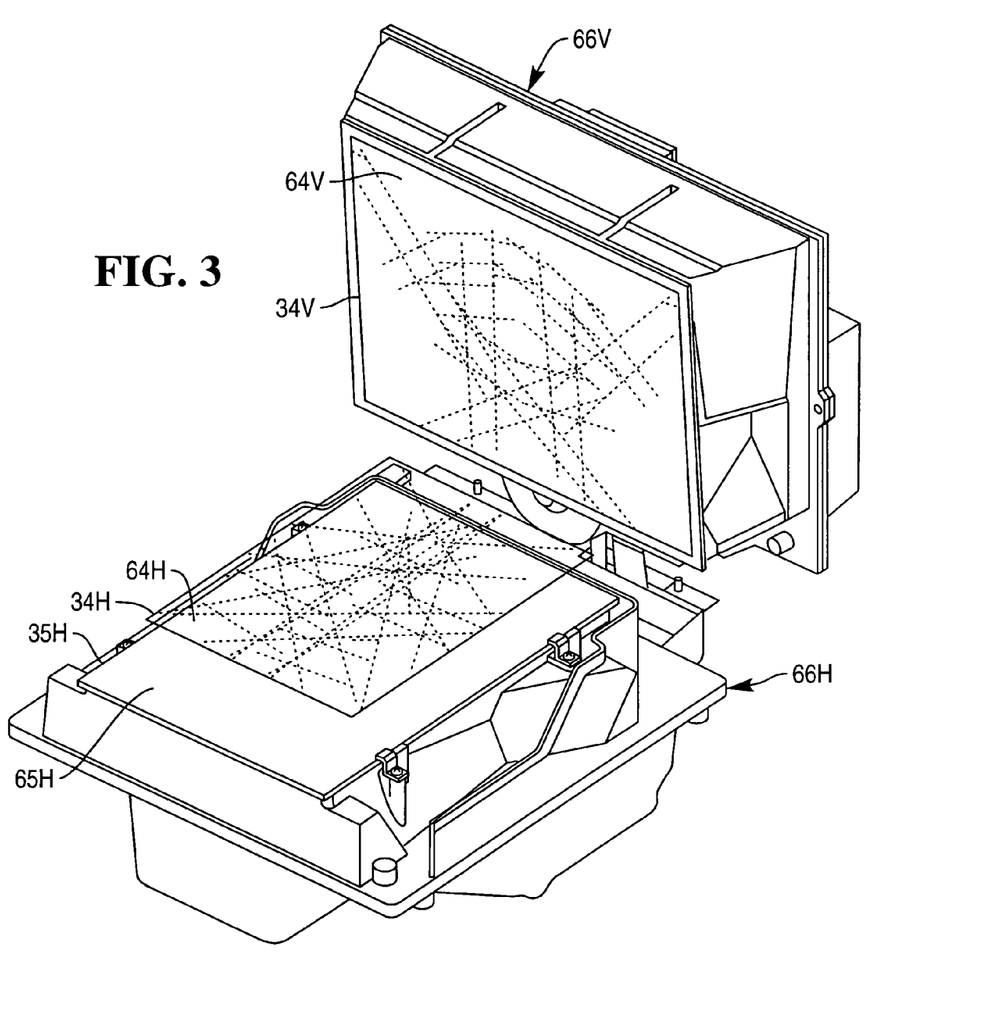
FIG. 3 is an interior perspective view of the scanner of FIG. 1, showing horizontal and vertical scanner portions.

Referring now to FIGS. 3-4, horizontal optics assembly 12H and vertical optics assembly 12V are shown in their positions within housing 52.

Horizontal optics assembly 12H and vertical optics assembly 12V each have nearly all of the optical components of a functional bar code scanner. Horizontal optics assembly 12H and vertical optics assembly 12V each have their own housings 66H and 66V and printed circuit boards 68H and 68V. In the illustrated example, control circuitry 36 is located in horizontal optics assembly 12H and signals vertical optics assembly 12V are brought to control circuitry 36 via cables 69.

Horizontal optics assembly 12H includes horizontal aperture 35H and window 65H. Scale weigh plate 62 with horizontal aperture 34H and window 64H are located above window 65H.

Horizontal optics assembly 12H will scan all label orientations on the bottom and checker sides of item 40, as well as certain orientations on the leading and trailing sides.

Optical pathing between laser 16H and polygon mirrored spinner 20H avoids contacting pattern mirrors 22H along the way. Laser 16H is located on a checker side of horizontal optics assembly 12H and polygon mirrored spinner 20H is located on the opposite side. Collection optic 24H is located adjacent laser 16H. The laser beam from laser 16H passes through hole 25H in collection optic 24H. Detector assembly 28H is located between collection optic 24H and polygon mirrored spinner 20H.

Spinners 20H and 20V are located where they are in order to generate suitable scan lines. In optics assembly 12H, the generation of the front vertical lines requires arcs of light reflected from a spinner 20H on the back side of the optical cavity.

Substantially vertical aperture 34V is oriented at an acute angle T of about 86 degrees from substantially horizontal aperture 34H. Other angular configurations, acute and obtuse, are also anticipated by the present invention.

Operationally, lasers 16H and 16V emit laser beams onto aiming mirrors 18H and 18V, which reflect the laser beams through holes 25H and 25V in collection optics 24H and 24V and then onto mirrored polygon spinners 20H and 20V. The polygon facets further reflect the laser beams up or down (for horizontal assembly 12H) or forward or rearward (for vertical assembly 12V), depending upon the facet struck. As the facets rotate, the laser beams are scanned in a shallow arc and reflected onto pattern mirrors 22H and 22V. In some cases, primary pattern mirrors reflect the laser beams through apertures 34H and 34V onto surfaces of item 40. In other cases, the primary pattern mirrors reflect the laser beams onto secondary mirrors that reflect the laser beams through apertures 34H and 34V onto surfaces of item 40.

As item 40 is moved through the scan zone (above horizontal aperture 34H and in front of vertical aperture 34V), scan lines generated by the laser beams from horizontal and vertical apertures 34H and 34V strike bar code label 42, no matter where it is located on item 42. A scan line will pass through all or part of bar code label 40.

Item 42 scatters light back along the path of the incident laser light. The scattered light passes through horizontal and vertical apertures 34H and 34V, onto the secondary mirrors (if present), onto the primary mirrors and onto the polygon facets. The rotating facets reflect the scattered light onto collection optics 24H and 24V. Collection optics 24H and 24V focus the scattered light onto detector assemblies 28H and 28V by way of routing mirrors 26H and 26V. Detector assemblies 28H and 28V convert the scattered light into electrical signals for analog processing by pre-video circuitries 30H and 30V and digital processing by control circuitry 36.

Referring now to FIG. 5, pattern mirrors 22H are shown in detail. Horizontal pattern mirrors 22H include primary pattern mirrors and secondary pattern mirrors. The primary pattern mirrors receive a laser beam directly from spinner 20H. The secondary mirrors receive the laser beam from some of the primary pattern mirrors.

The term "front" as applied to mirrors means operator or checker side. The term "rear" as applied to mirrors means the side opposite to the operator or checker side. As illustrated, horizontal pattern mirrors 22H exhibit substantially bilateral symmetry between the leading and trailing sides of horizontal optics assembly 12H.

The primary pattern mirrors include left rear diagonal mirror 86, right rear diagonal mirror 88, left front vertical mirror 78, right front vertical mirror 80, left horizontal mirror 82, right horizontal mirror 84, left front picket mirror 70, right front picket mirror 72, left front diagonal mirror 102, right front diagonal mirror 104, left front bottom picket mirror 74, and right front bottom picket 76.

The secondary pattern mirrors include left rear diagonal mirror 94, right rear diagonal mirror 96, left front vertical mirror 90, right front vertical mirror 92, left horizontal mirror 98, and right horizontal mirror 100.

FIGS. 6 and 7 illustrates a mirrored polygon spinner assembly 120, for use with an optical scanner 12 described above. The assembly 120 comprises a spinner 122 and a means of rotating the spinner 124 in the form of a DC brushless motor. However, other motors or alternative means for rotating the spinner can be envisages by a person skilled in the art. The spinner 122 is arranged both to spin around an axis of rotation 126 and to move so as to displace said axis of rotation 126, as will described below. The spinner 122 is an externally mirrored spinner.

The spinner 122 is mounted on a pivotable mount 128, which is in turn mounted to a pair of fixed supports 130 on one side of the spinner 122 and to a movable mount 132 on the other side of the spinner 122. The movable mount 132 is a linear actuator, actuation of which causes the pivotable mount to pivot on the fixed support.

When in use a bar code is scanned by a laser light produced by a light source and directed through the scanner window as described above. However in a scanner in accordance with the present invention the movement of the spinner causes a corresponding movement or oscillation of the scan lines in a direction orthogonal to the scan direction. In particular, the scanned ray fans move back and forth in a direction normal to their planes. This motion is maintained throughout the pattern generation process, so that (at a scanned bar code surface for example) a vertical scan line will move left and right, a horizontal scan line will move up and down, etc. The magnitude of this orthogonal scan is arranged to be such that the gaps between adjacent parallel scan lines are filled in by the orthogonal motion. Accordingly, previously missed bar codes will be scanned.

The foregoing description of the preferred embodiments of the invention has been presented for the purposes of illustration and description. It is not intended to be exhaustive or to limit the invention to the precise form disclosed. Many modifications and variations are possible in light of the above teaching within the spirit and scope of the invention as claimed.

What is claimed:

1. An optical scanner comprising a scanner housing including a scan window, a laser light source, reflected light detector, a pivotable mount where one side of the mount is mounted to a fixed support and the other side of the mount is mounted to a movable support and a mirrored polygon spinner mounted to the pivotable mount and arranged both to spin around an axis of rotation and to move so as to displace said axis of rotation.

2. The optical scanner of claim 1, wherein the spinner is moved linearly so as displace said axis of rotation.

3. The optical scanner of claim 1, wherein the movable support is a linear actuator, actuation of which causes the pivotable mount to pivot on the fixed support.

4. The optical scanner of claim 1, wherein the axis of rotation is directed substantially towards the scan window.

5. The optical scanner of claim 1, wherein the polygon spinner is externally mirrored.

6. The optical scanner of claim 1, further comprising pattern mirrors arranged to direct light from the polygon spinner through the scan window so as to produce scan lines.

7. The optical scanner of claim 1, further comprising control circuitry in the scanner housing for obtaining bar code information from electrical signals from the reflected light detector.

8. A mirrored polygon spinner assembly, for use with an optical scanner, the assembly comprising a pivotable mount where one side of the mount is mounted to a fixed support and the other side of the mount is mounted to a movable support, a spinner mounted to the pivotable mount and a means of rotating the spinner, the spinner being arranged both to spin around an axis of rotation and to move so as to displace said axis of rotation.

9. The mirrored polygon spinner assembly of claim 8, wherein the spinner is moved linearly so as displace said axis of rotation.

10. The mirrored polygon spinner assembly of claim 8, wherein the movable support is a linear actuator, actuation of which causes the pivotable mount to pivot on the fixed support.

11. The mirrored polygon spinner assembly of claim 8, wherein the spinner is externally mirrored.

12. A method of scanning a bar code utilizing an optical scanner comprising a scanner housing including a scan window, a laser light source, reflected light detector, a pivotable mount where one side of the mount is mounted to a fixed support and the other side of the mount is mounted to a movable support and a mirrored polygon spinner mounted to the pivotable mount and arranged both to spin around an axis of rotation and to move so as to displace said axis of rotation, the method comprising positioning the bar code within the scan volume and moving the spinner so as to displace the axis of rotation which in turn causes movement of the scan lines orthogonally to the direction of said scan lines.

13. The method of claim 12, wherein the spinner is pivoted back and forth.

* * * * *